United States Patent
Wunsche

[19]

[11] Patent Number: 6,024,912
[45] Date of Patent: Feb. 15, 2000

[54] APPARATUS AND PROCESS SYSTEM FOR PREHEATING OF STEEL SCRAP FOR MELTING METALLURGICAL FURNACES WITH CONCURRENT FLOW OF SCRAP AND HEATING GASES

[75] Inventor: Robert R. Wunsche, Oshawa, Canada

[73] Assignee: Empco (CANADA) Ltd., Canada

[21] Appl. No.: 09/198,786

[22] Filed: Nov. 24, 1998

Related U.S. Application Data

[60] Provisional application No. 60/099,757, Sep. 10, 1998.

[30] Foreign Application Priority Data

Nov. 27, 1997 [CA] Canada ................................. 2222401

[51] Int. Cl.$^7$ ..................................................... F27D 13/00
[52] U.S. Cl. .......................... 266/44; 266/156; 266/901; 373/80
[58] Field of Search ................................... 266/901, 156, 266/142, 44; 75/581, 10.65; 373/80

[56] References Cited

U.S. PATENT DOCUMENTS

| | | | |
|---|---|---|---|
| 3,632,094 | 1/1972 | Longnecker | 266/901 |
| 4,328,388 | 5/1982 | Longnecker | 373/80 |
| 4,543,124 | 9/1985 | Vallomy | 75/46 |
| 4,691,900 | 9/1987 | Maeda | 266/156 |
| 4,736,383 | 4/1988 | Meierling | 373/80 |
| 4,852,858 | 8/1989 | Weber | 266/175 |
| 5,153,894 | 10/1992 | Ehle et al. | 373/80 |
| 5,264,020 | 11/1993 | Ehle et al. | 75/10.38 |
| 5,499,264 | 3/1996 | Schaller et al. | 373/78 |
| 5,513,206 | 4/1996 | Mori et al. | 373/80 |
| 5,555,259 | 9/1996 | Feuerstacke | 373/80 |
| 5,573,573 | 11/1996 | Berger et al. | 75/10.63 |

*Primary Examiner*—Scott Kastler
*Attorney, Agent, or Firm*—Mark Kusner

[57] ABSTRACT

The invention provides a novel preheating apparatus and method for preheating a ferrous scrap mixture prior to feeding the scrap into a metallurgical furnace, primarily using heat recovered from hot waste gases emitted from the furnace exhaust port, and simultaneously reducing contaminants from the scrap and from the waste gases, with concurrent downward flow of hot waste gases and downwardly descending scrap. The apparatus has a chamber, including a top compartment with a cold scrap input for depositing cold scrap into the top compartment and a hot waste gas inlet in flow communication with the furnace exhaust port. The chamber also has a bottom compartment with a heated scrap discharging mechanism for force delivering the heated scrap into the furnace and a waste gas outlet in flow communication with a vacuum exhaust for evacuating spent waste gas. Gas permeable gates are disposed between each chamber compartment and sequentially operate between a closed gate position and an open gate position, for concurrently receiving a gravity fed charge of scrap from the cold scrap input in a closed gate position, and during a predetermined dwell period supporting the scrap charge while hot waste gas flows downwardly from the hot gas inlet in the top compartment, permeates through the scrap charge and through the closed gates, and flows out the waste gas outlet in the bottom compartment. The gates mix the scrap as it falls and serve to control the gravitational descent of the scrap charge from the top compartment to the bottom compartment on expiry of the dwell period.

20 Claims, 7 Drawing Sheets

APPARATUS AND PROCESS SYSTEM FOR PREHEATING OF STEEL SCRAP FOR MELTING METALLURGICAL FURNACES WITH CONCURRENT FLOW OF SCRAP AND HEATING GASES

This application claims the benefit of U.S. Provisional Ser. No. 60/099,757 filed Sep. 10, 1998.

TECHNICAL FIELD

This invention relates to an ecologically friendly and energy highly efficient, autonomous, gas tight, self-charging apparatus and closed circuit process system for semi-continuous, self-charging of cold charge ferrous scrap mixture, via integrated inclined scrap bin elevator, its stepped preheating and delivering of preheated charge into adjacent, in tandem operating, metallurgical—electric arc furnace, using primarily sensible and chemical heat of the hot waste gases from the metallurgical—electric arc furnace, for consequent more energy efficient, rapid melting of the preheated charge.

BACKGROUND OF THE ART

Metallurgical processes of primary iron and steelmaking belong to the most energy intensive of all production processes in the industry as a whole. Therefore, their overall energy balance was always of great interest to metallurgists. Better understanding of limitations of non-renewable energy resources and eventually energy cost crisis in 1970's have initiated intensive activity for lowering of energy consumption also from the side of energy producers and suppliers. Furthermore, ecological considerations and the vital necessity of environmental protection are becoming deciding factors to control all branches of the industry. Since metallurgical processes of iron and steelmaking are leading also in high emissions of air polluting toxic gases, as well of production of solid hazardous wastes, it is logical that they are more and more in the spotlight of attention of public and primarily of government authorities responsible for clean environment. For the above reasons there is world wide effort to the improve energy balance of the metallurgical processes by improving energy efficiency as much as possible. In some measure this has been achieved by replacing one type of fuel or energy with another, more suitable for the specific process or its particular stage, with highest respect and consideration for ecology, economy and availability. The first priority in reducing energy consumption in the majority of smelting and melting metallurgical processes is the highest possible utilisation of the so far unused process system energy losses, such as sensible and chemical heat of waste exhaust gases. By returning part of this energy, by the most direct route possible, into the metallurgical process which produced the waste exhaust gases, initial energy requirements will be reduced, resulting in overall higher energy efficiency of the process. In compliance, most sincere and well thought efforts to utilise waste energy contained in the off-gases, in as possible direct way, lead to designs which incorporate energy recuperating devices for scrap preheating into a current electric arc furnace structure. So far, in contrast with expectations, these state of the art amalgamated electric arc furnace aggregates, of complicated design, are reaching only some of all anticipated performance results. High initial and installation costs, malfunction of mechanisms, extensive maintenance, pollution and safety problems culminating in dangerous explosions are evident reasons for raising questions of their suitability in general. With current and future environment protection rules, these question are becoming increasingly pertinent, since toxic emissions from current state of art scrap preheating devices are not meeting all stipulations and criteria of the valid or proposed regulations for permissible levels of toxic substances emitted into atmosphere.

On the other hand, it was well known, that the most promising and efficient method for indirect energy saving, especially for electric arc furnace steelmaking from scrap, is the high temperature preheating of a metallic charge before charging into the furnace, in a separate heating device, better known as "pre-charge scrap preheating". Be that as it may, because of the lack of a fully developed design of this type of scrap preheating equipment for electric arc furnace steelmaking, it was only sporadically used in an underdeveloped "scrap in bucket preheating" configuration.

Alongside rising energy and ecological concerns there is ever present endeavour to intensify any and all phases of the electric arc furnace steelmaking process, above all increasing productivity and reducing operating costs. For example, further increases of electric power input via optimally increased secondary voltage complimented with adequate foamy slag practice; instantaneous recuperation of chemical energy via post-combustion of combustible gases directly in the furnace vessel before they are exhausted; addition of oxy-fuel burners to the furnace vessel for intensification and acceleration of rapid scrap melting; preheating of the ferrous scrap charge prior to charging into the furnace by using sensible and chemical heat energy contained in the off-gases plus oxy-fuel burners; and finally, introduction of supersonic gaseous oxygen lances for intensification of decarburization and foaming up of slag.

Of the aforementioned process intensification methods, the three methods for increasing temperature of scrap by other means then via electric arc, are: instantaneous recuperation of chemical energy in the vessel via post-combustion; and addition of oxy-fuel burners to the furnace vessel and preheating of the ferrous scrap charge prior to its charging into the furnace vessel.

The intent of the first method is instantaneous recuperation of chemical energy directly in the furnace vessel, by combusting via gaseous oxygen the combustible components of off-gases developed by the process of scrap melting, before being exhausted. This method is being exploited with variable success in open-hearth furnaces, basic oxygen furnaces and energy optimising furnaces. Preheating of oxygen enriched air by sensible heat of the exhausted off-gases from the vessel are used instead of gaseous oxygen as a variant of this method. Nevertheless, success of this method, applied to electric arc furnaces is showing only limited productivity improvement and electric energy saving, primarily when used during the stage of melting scrap simultaneously with electric arc. Actual energy saving is the result of in-situ scrap preheating. Use of post-combustion in electric arc furnaces with already molten scrap is in reality significantly curbed by unsatisfactory heat transfer efficiency from post-combustion gases into the bath, covered by deep layer of thermally insulating and foamy slag. Combustion or so called post-combustion of combustible components of the off-gases emerging from the foamy slag increases the temperature and consequently volume of the off-gases in the free space above the slag. Successive, proportionally increased pressure of the off-gases in the furnace vessel is therefore abating aspiration of the cold ambient air into the furnace vessel. Hence, while keeping the necessary internal temperature of the furnace vessel the same, electric energy requirement for heating of the cold air is eliminated, ultimately resulting in its saving. It should be noted, that in comparison with the post-combustion, requiring additional oxygen at added cost, an equal or higher energy saving, at no cost, is achieved by adequately sealing of the furnace vessel and on that account preventing intake of the cold air. Moreover, a consequent and exceptional benefit of adequate sealing the electric arc furnace is in the drastically reduced quantity of hot off-gases to be exhausted from the furnace. In the case of a 110 tonnes furnace, for example, the quantity of the gases to be handled was reduced more than 50% (from 90,000 $Nm^3/h$ to 40,000 $Nm^3/h$), allowing the stopping of one of the exhaust fans.

The purpose of the second method, for increasing the temperature of the scrap by other means than via electric arc is, intensification and acceleration of rapid scrap melting by addition of oxy-fuel burners in the furnace vessel. Although positive results were obtained from introduction of oxy-fuel burners for faster melting of the scrap in the region of the slag door tunnel of the electric arc furnace vessel over 30 years ago, they have not been used to a great extent until Ultra High Power furnaces with watercooled panels have been built. Beneficial performance of short flame oxy-fuel burners located in the vessel walls in the "cold" zones between electrodes have caused shortening of the time for melting of all scrap in the furnace. These positive results started a fashionable avalanche of burner additions to the vessels of electric arc furnaces. In last few years numerous types of oxy-fuel burner designs with ever increasing capacities have been made available for electric arc furnaces. Currently, the thermal power input of these burners represents in some cases more than 50% of initial electric energy power input. Although this, low cost, addition of overall power input shortens the tap-to-tap times, with the desired productivity increase and induces some to other operating and economic benefits, many other serious disadvantages are overlooked and suppressed. In general, some of the major disadvantages are: higher oxidation of the scrap, larger volume of off-gases, substantially lowered heat transfer efficiency if burners are operated simultaneously with electric arc power input, especially if the burners are operating all the time during the heat. Practical operating results have proved that highest energy efficiency is achieved when the heat is started with burners only, which are substituted with electric arcs only after the charge has reached temperature of about 800° C. This two-stage operating practice resulted in 15–20% electric energy saving and 10–15% saving of fossil fuel and oxygen. However, because of sequential application of both types of thermal energy the tap-to-tap time has increased by 10–12%. Economically, the cost of installation of oxy-fuel burners to the existing furnace vessel is relatively low, yet in almost all cases it resulted in substantial costs for rebuilding and enlarging of the entire exhaust system. From a broad ecological view point, operation of such electric arc furnaces with excessive use of oxy-fuel burners and lowered energy efficiency, produce a disproportionately higher volume of hazardous components contained in off-gases, and such processes are becoming categorically unacceptable.

The objective of the third method, in increasing the temperature of the scrap by other means then via electric arc is, preheating of the ferrous scrap charge prior to charging into the furnace by efficiently using sensible and chemical heat energy contained in the off-gases plus use of oxy-fuel burners, if necessary for ecological reasons and concerns.

From its introduction, scrap preheating went through several development stages: batch preheating in the charging bucket with hot waste gases from the furnace or with air- and oxy-fuel burners; continuous preheating via inclined rotating kiln or horizontal vibrating conveyor using a combination of hot waste gases from the furnace and air- and oxy-fuel burners; continuous vertical preheating mechanism with controlled scrap descent, being an integral part of the furnace and using hot waste gases from the furnace in counter current flow; and as well "in situ" preheating of the scrap already charged into the furnace at the beginning of the heat simultaneously with electric arc via a variety of different designs of air- and oxy-fuel burners. There are several other unique scrap preheating mechanisms being combinations of the above discussed systems and operating with more or less success.

Currently scrap preheating is gaining long time overdue recognition. By recognising its great potential, it is now considered that it will be the next production process milestone for electric arc furnace steelmaking mainly from scrap, with respect to electric energy saving, reduction of electrode consumption, productivity increase by shortening the tap-to-tap time and the very important benefit of reduction of environment pollution in general.

From experience with the process of steelmaking in an electric arc furnace predominantly from recycled mixture of ferrous charge—cold steel scrap, it could be concluded, that adequate preheating of the scrap prior to charging into the furnace for rapid efficient melting is the most suitable method.

In the recent past, several types of equipment and processes for preheating scrap have been introduced and made available to the electric arc furnace steelmaking industry, generally in accordance with the following U.S. patents:

U.S. Pat. No. 4,543,124 (24.09.1985) describes an "Apparatus for continuous steelmaking", known in the industry as "Consteel Process". The process uses the furnace off-gas and fuel to "pre-charge preheat" the scrap moving on a conveyor in a special horizontal preheater tunnel. The scrap is fed into the furnace through the hole in the shell side wall. The off-gas flows counter-current to the scrap. The EAF maintains a liquid heel following tapping. Electric energy consumption in the range 350–400 kWh/ton is too high, when compared to current electric arc furnace consumption standards. The apparatus by itself is requires a large space for conveyors. Scrap preheating on conveyors is not very energy efficient, because scrap is preheated predominantly from above.

U.S. Pat. No. 4,852,858 (01.08.1989) describes a "Charging Material Preheater for preheating charging materials for a Metallurgical Smelting Unit". This process known in the industry as "Energy Optimising Furnace" has favourable results and is used in production. However, this semi-continuous vertical scrap preheating apparatus with controlled scrap descent, is an integral part of a non-electric metallurgical furnace using counter-flow hot waste gases from almost complete post combustion in the furnace vessel located under the preheating apparatus. Favourable operating results of this design eventually induced some designers of electro-metallurgical equipment to adapt this, considerably modified, concept to the electric arc furnace. Overall height and large, uncontrolled infiltration of the false air into individual chambers are considered as drawbacks.

U.S. Pat. No. 5,153,894 "(06.10.1992) describes a smelting plant with removable shaft-like charging material preheater", known in the industry as a "Shaft Furnace", is a batch charged, smelting plant with shaft like material preheater which is an integral part of the furnace and with counter-current hot gas flow. By a horizontal relative movement between the furnace vessel and the holding structure, together with the vessel cover, charging material can be charged from a scrap basket directly into the furnace vessel or through the displaced shaft into different regions of the furnace vessel. Charging material can be retained in the shaft by means of a blocking member therein, and heated up during the refining phase. One of the alternatives has several design problems such as a complicated design manifested by batch charging into furnace from the shaft, two pivoting assemblies in order to allow direct top charging or to exchange shell, disfigured shape of the shell due to side mounted shaft structure for scrap preheating, tilting arrangement of the shell only, creates a large gap between shell and roof resulting in heat loses, uncontrolled scrap descent through the shaft causing occasional jamming and sliding of large portion of scrap, improper counter-current flow of gases through the shaft resulting in uneven preheating of the scrap in the shaft and two serious processing system problems: temporary, uncontrollable creation of explosive mixture and emission of toxic substances due to low waste gases temperature at the exit from the shaft. In addition to the fact that reheating of this gases via burners is in principle and de facto defeating the purpose of this type of preheating system, the possibility of emission of toxic substances and explosions are not eliminated and they occur from time to time on each of these kind of furnaces.

U.S. Pat. No. 5,264,020 (23.11.1993) describes a "Smelting plant with two melting furnaces arranged in juxtaposed relationship", known in the industry as "Double Shaft Furnace". This is actually an aggregate of two Shaft Furnaces in juxtaposed relationship and which are operated alternately, wherein the furnace gases which are produced in the melting process are respectively introduced into the other melting furnace for the purposes of preheating the charging material. Associated with each melting furnace is a shaft which is loaded with charging material. The waste gases from the furnace which is in the melting mode of operation are introduced from the shaft, after charging of the other furnace, through the cover of the other furnace and are removed from the shaft thereof. That procedure, throughout the entire smelting operation, permits preheating of the charging material and filtration of the furnace gases when they are passed through the charging material. Since "Double Shaft Furnace " is de facto very similar to the "Shaft Furnace" with slightly different charging arrangement, all of the comments concerning "Shaft Furnace" are to applicable also to this furnace aggregate.

U.S. Pat. No. 5,499,264 (12.03.1996) describes "Process and arrangement for operating a double furnace installation", known in the industry as "Twin-shell furnace". This arrangement is also de facto an aggregate of two practically complete mechanical assemblies of single electric arc furnaces, eventually in juxtaposed relation. It is disclosed as: a process for operating a double furnace installation having two arc furnaces connected via a line, a power supply, a device for charging material, and an arrangement for extraction and purification of gas. The process including the step of connecting a first one of the two furnaces with the power supply for melting a charge located therein, completely cutting off a second one of the furnaces from the power supply. The second furnace is the charged with charging material and is closed with a cover. Flue gas located in the closed second furnace is sucked out above the burden column and flue gas is sucked out of the first furnace above the surface of the melted charge through the second furnace via the connection line provided between the two furnaces. A flue gas connection of the first furnace to the gas purification arrangement is interrupted while the flue gas is being sucked out of the second furnace while feed air is simultaneously taken on in the region of a cover of the first furnace.

In principle, the flow of preheating gases is counter current with respect to the scrap. Higher productivity is achieved with complex design of exhaust system. Scrap preheating is non-uniform, resulting in higher oxidation losses. Top charging of the two vessels still requires removing of the furnace roof, resulting in additional heat losses.

U.S. Pat. No. 5,513,206 (30.04.1996) describes an "Apparatus for preheating and charging scrap material". This apparatus for preheating and charging scrap material encompasses a shaft like preheating chamber and charging unit. The furnace exhaust gas flows counter current to the falling scrap. A two stage scrap pusher delivers the charge through the opening in the roof into a space between the two DC electrodes. The two electrode DC furnace receiving preheated scrap is completely sealed and does not use water-cooled wall panels. This furnace is of extremely complex design. Scrap pushing is complicated. The shaft is narrow and therefore is equipped with several anti-bridging devices. Also the high overall height is a significant drawback.

U.S. Pat. No. 5,555,259 (10.09.1996) describes a "Process and device for melting down scrap", known in the industry as "Contiarc". The disclosed furnace is a DC arc-heated shaft furnace with an annular shaft formed by outer and inner vessels that surround and protect a central graphite electrode. Scrap is fed continuously with an appropriate system in the upper part of the annular shaft at a rate corresponding to the melt-down rate in the lower section of the furnace. During its descent, scrap is preheated by the ascending gases. When these gases leave at low temperature from the top of the scrap column, they are captured in a ring duct and conveyed away for waste gas treatment. It is claimed that this furnace will have low volume of dust emission through off-gases owing to the filtering effect of the scrap column. This design is in accordance with efforts to combine an electric furnace and scrap preheating in one, amalgamated design. Scrap charging system is complicated, scrap descent is not controlled, therefore bridging will occur. Furnace has not tilting mechanism and therefore replacement or exchange of the bottom part will be difficult.

U.S. Pat. No. 5,573,573 (12.11.1996) describes an "Electric arc furnace arrangement for producing steel", known in the industry as "Comelt". Disclosed is an electric arc furnace for the production of steel by melting scrap, in particular iron scrap, and/or sponge iron and/or pig iron as well as fluxes in a furnace vessel, into which at least one graphite electrode projects, which is displaceable in its longitudinal direction, wherein an electric arc is ignited between the graphite electrode and the charging stock. To achieve particularly high energy input, the sloping graphite electrode projects into a lower part of the furnace vessel from a side and the lower part, in the region of the graphite electrode, has an enlargement radially protruding outwardly relative to the upper part. The furnace has an extended vertical shaft and it is continuously charged with cold scrap via a conveyor. It is claimed that off-gases, in counter flow to descending scrap are at the top of the shaft, after preheating the scrap, still sufficiently hot and rapidly cooled by dilution, so that no toxic gases are evolved. In another version, gases are collected. This is a complex, amalgamated design claiming very low electric energy consumption.

In addition, all of the above prior art methods have a fundamental, indubitable disadvantage and drawback:

Counter-current flow of hot waste gases to the flow of the scrap is a fundamental, functionally adverse, feature. In the majority of cases prior art scrap preheating apparatus, devices and process systems this is the main reason for their unsatisfactory performance.

In summary, with respect to productivity, energy saving, pollution and safety of operation, the results from efforts aimed at intensification of electric arc furnace steelmaking processing predominantly from scrap, using Prior Art scrap preheating equipment, clearly indicate that their level of achievement is below achievable performance levels for a "pre-charge" scrap preheating apparatus properly applying fundamental laws of physics and correct exploitation of practical experience.

OBJECTS OF THE INVENTION

An object of the present invention is to provide an autonomous, independently operating, supplementary, energy efficient, pollution reducing and safely operable apparatus and process system with concurrent downward flow of scrap and downward flow of hot waste gases. The invention provides a semi-continuous self-charging, controlled, stepped and gradual preheating of cold ferrous scrap mixture—steel scrap and discharging of preheated scrap into an adjacent, in tandem operating, sealed metallurgical-electric arc furnace, to overcome all aforementioned drawbacks and disadvantages.

Another object of the invention is to provide a main vertical chamber of inherent prismatic form having pyramidal converging portion at its bottom and removable sealing cover at the chamber top for semi-continuous feeding and charging of the cold charge of ferrous scrap mixture into the chamber.

Another object of the invention is to provide a main vertical chamber with walls consisting of refractory or water cooled segments attached to appropriate self-standing supporting structure.

Another object of the invention is to provide an independently operating, simple and sturdy charging-supplying mechanism for semi-continuous feeding of cold ferrous scrap mixture from the adjacent scrap storage. The charging mechanism is preferably located on a lower floor level and operates independently without requiring use of separate charging bucket or overhead crane. Also preferably the scrap is dumped into the uppermost compartment of the main vertical chamber, equipped with charging opening sealing closure, the charging mechanism consisting in principle of at least one inclined high velocity elevator outfitted with an permanent charging bin.

Another object of the invention is to provide one or more robust and adequately cooled scrap gravitational descent controlling mechanisms, each consisting of frames with semi-gridirons performing controlled sequential rotating and retracting-extending motions, dividing the volume of the main vertical chamber in at least two compartments, being capable of holding at any time no less than the nominal charge required for one heat of the adjacent, in tandem operating, metallurgical-electric arc furnace.

Another object of the invention is to provide one or more oxy-fuel burners, with swift control of variable oxygen/fuel ratio, into each compartment of the main vertical chamber for continuously controlled combustion of combustible gases developed through the entire height of the main vertical chamber, resulting in controlled gradual preheating of the charged ferrous scrap mixture to the required temperature before discharging into the furnace.

Another object of the invention is to provide sensors in each compartment of the main vertical chamber and other locations of the gas flow ducting for real time instant analysis of gases and temperature measurement, used for prompt correction and control of proper evacuating pressure and gradual combustion of the combustible gases developed during preheating process.

Another object of the invention is to provide a simple, sturdy heat resisting discharge mechanism for controlled discharging of high temperature preheated scrap from the opening in the converging lower part of the main vertical chamber and forced delivering of preheated scrap into adjacent metallurgical-electric arc furnace through the opening in the shell side wall or roof. The discharging mechanism consisting in principle of a sliding closure of the opening in a converging part of main vertical chamber, scrap levelling roll and inclined, reciprocating elevating device having a trolley-trough outfitted with an internal ram with reciprocating motion.

Another object of the invention is to provide two inlet openings at the highest point of the top compartment, one of them for entrance of hot waste gases from the metallurgical-electric arc furnace and containing sensible and chemical thermal energy and the second opening for entrance of partially recirculated recuperative hot gases from the final post-combustion chamber.

Another object of the invention is to provide a commensurate negative pressure and which creates appropriate suction effects at different points of the apparatus and most importantly forces combination of any and all gases entering the main vertical chamber, to flow from the highest point of the top compartment downwards through the layers of scrap in the direction of flow concurrent with the flow of gravitationally descending scrap, combined hot gases encompassing the initial hot waste gases from the in tandem operating, metallurgical-electric arc furnace, recuperative hot gases from terminal post combustion chamber, hot gases generated by oxy-fuel burners located in the walls of the compartments and as well hot gases resulting from oxidation of combustible substances contained in the charge via administered oxygen, oxygen enriched air or air.

Another object of the invention is to provide a set of two parallel and analogical, combined final combustion chamber/diverging dust catchers and a drop out box directly and vertically in-line under the discharging converging bottom compartment of the main vertical chamber, with hot waste gases from the two slit openings in the main vertical chamber converging bottom are directed into the top part of each of final combustion chamber/dust catchers equipped with variable ratio oxy-fuel burners for final total combustion of combustible substances and temperature conditioning, preventing dioxin and furan development.

Another object of the invention is to provide more than one, preferably two hot waste gases by-pass ducts, equipped with appropriate closing/opening ducts valving for connecting the main exhaust duct from the, in tandem operating, electric arc furnace into preheating apparatus with the upper spaces of the two combined final combustion chamber/diverging dust catcher enabling hot waste gases to be exhausted directly from furnace into final combustion chambers, hence facilitating total by-passing of the preheating apparatus and allowing the electric arc furnace to operate independently, without flowing through the scrap preheating apparatus;

Another object of the invention is to provide a slit type Venturi scrubber with priority function to provide instantaneous shock cooling of the hot waste gases, below the lower critical temperature of de novo synthesis of dioxins, and with the additional function of further cleaning the gases.

Other objects and features of the present invention will become apparent from the following summary of the preferred embodiments of the invention and detailed description considered in conjunction with the accompanying drawings. It is to be understood, however, that the drawings are introduced solely for the purposes of illustration and not as definition of the limits of the invention, for which reference should be made to the appended claims.

DISCLOSURE OF THE INVENTION

The invention provides a novel preheating apparatus and method for preheating a ferrous scrap mixture prior to feeding the scrap into a metallurgical furnace, primarily using heat recovered from hot waste gases emitted from the furnace exhaust port, and simultaneously reducing contaminants from the scrap and from the waste gases, with concurrent downward flow of hot waste gases and downwardly descending scrap. The apparatus has a chamber, including a top compartment with a cold scrap input for depositing cold scrap into the top compartment and a hot waste gas inlet in flow communication with the furnace exhaust port. The chamber also has a bottom compartment with a heated scrap discharging mechanism for feeding the heated scrap into the furnace and a waste gas outlet in flow communication with a vacuum exhaust for evacuating spent waste gas. Gas permeable gates are disposed between each chamber compartment and sequentially operate between a closed gate position and an open gate position, for concurrently receiving a gravity fed charge of scrap from the cold scrap input in a closed gate position, and during a predetermined dwell period supporting the scrap charge while hot waste gas flows downwardly from the hot gas inlet in the top compartment, permeates downwardly through the scrap charge and through the closed gates, and flows out the waste gas outlet in the bottom compartment. The gates mix the scrap as it falls and serve to control the gravitational descent of the scrap charge from the top compartment to the bottom compartment on expiry of the dwell period.

In operation the apparatus carries out a method of preheating a ferrous scrap mixture prior to feeding the scrap into a metallurgical furnace, primarily using heat recovered from hot waste gases emitted from the furnace exhaust port, and simultaneously reducing contaminants from the scrap and from the waste gases, with concurrent downward flow of hot waste gases and downwardly descending scrap, as follows. A charge of cold scrap is deposited on a gas permeable closed gate within a top compartment of a chamber, the top compartment including a hot waste gas inlet in flow communication with the furnace exhaust port. The scrap is supported on the closed gate for a predetermined dwell period while hot waste gas flows downward from the hot gas inlet in the top compartment, permeates through the scrap charge and through the closed gate, and flows out a waste gas outlet in a bottom compartment of the chamber. By opening the gates the gravitational descent of the scrap is controlled permitting scrap flow from the top Rio compartment to the bottom compartment on expiry of the dwell period. Thereafter, the heated scrap is force delivered from the bottom compartment into the furnace. Successive discreet charges of scrap are preheated by repeating the above steps in a sequentially stepped manner.

Accordingly, to overcome the disadvantages and drawbacks of scrap preheating devices and methods of known in the prior art, scrap preheating according to the invention is to be performed in an independent and autonomous, separate, self-standing, self-charging and discharging, simple, robust, almost maintenance free scrap preheating apparatus and process system, adjacent to the sealed metallurgical-electric arc furnace. The preheating apparatus structure could be added, economically and without large modifications to an existing or new electric arc furnace melting facility. By working in tandem with sealed metallurgical-electric arc furnace, the high energy efficiency and operating performance of the scrap preheating apparatus and closed-circuit process system in accordance with the object of invention will substantially influence the efficiency of the steelmaking process.

In addition a particularly important benefit is the significant lowering of the volume of polluting toxic gases and substances. The scrap preheating apparatus and closed-circuit process system in accordance with the object of invention will, contribute to reduction in the consumption of electric and other energies, reduction of electrode consumption and shortening of the tap-to-tap time, with improved safety and working environment, and on the whole culminating in overall improved performance and profitability.

When considering operation of a conventional contemporary steelmaking electric arc furnace with top charged cold ferrous scrap mixture via one or more charging bucket loads, the amount of process gases exhausted or escaping from the furnace depends on several factors. These factors are: composition of the charge, quantity and quality of used lime and other additives, amount of gases generated by the oxy-fuel burners, quantity of carbon and oxygen introduced for foaming up of slag etc., and what is of foremost importance, on the quantity of ambient cold air inspired into the furnace. Without sealing, gas tightening of the furnace vessel as much as practically possible, even in the case of so called direct evacuation via fourth hole in the roof, the amount of exhausted gases could reach 350–450 $m^3$/tonne of produced steel. In absence of cold air inspiration, what is achieved with gas tight sealing of the furnace and without use of gaseous oxygen decarburizing lance, the amount of hot waste gases exhausted via the fourth hole drops to a range of 90–120 $m^3$/tonne of produced steel. With use of decarburizing oxygen lance the amount of gases exhausted increases proportionally to the amount of injected decarburizing oxygen to a range of 200–220 $m^3$/ton of produced steel.

Furthermore exhausted hot waste gases contain significant amounts of hazardous by-products. One example of some impurities in the hot waste gases exhausted via fourth hole, when air is inspired into furnace vessel, is shown in the table I. The very high temperature surrounding the electric arc and high temperatures in the furnace vessel in general brings about formation of large amounts of carbon oxides, and as well the following micro by-products: nitrogen- and sulphur oxides, cyanides, fluorides, dioxins and furans. The concentration of nitrogen oxides and cyanides depends primarily on the quantity of nitrogen inspired into the furnace with the cold air, the power of the electric arcs and the degree of dissociation of molecular nitrogen inside the furnace. The amount of sulphur oxides in the gases is usually not very large. The concentration of fluorides in the gases is also low and it is directly related to the content of fluorspar in the slag. Content of dioxins and furans is governed by the quantity of combustible contaminants included in charged scrap, their generation and destruction being controlled by the temperature of the off-gases.

TABLE I

Content of harmful gaseous products in hot waste gases exhausted from electric arc furnace

| Harmful substances | Average concentration mg/m$^3$ | Amount of by-products exhausted g/tonne of produced steel |
|---|---|---|
| Carbon oxides | 13,500.0 | 1,350.0 |
| Nitrogen oxides | 550.0 | 270.0 |
| Sulphur oxides | 5.0 | 1.6 |
| Cyanides | 60.0 | 28.4 |
| Fluorides | 1.2 | 0.56 |

Concerning the dust exhausted from the furnace with gases, the bulk of it, up to 60–70%, consists of particles less than 3 micrometers across. The dust generated during a heat, with inspiration of air into the furnace, contains large amount of ferroxide $Fe_2O_3$.

When considering present state of pollution of the environment in general it is vitally important to reduce to the achievable minimum generation of harmful products primarily by industrial processes as a whole. However, this task must be achieved by the means acceptable to the industry. Reduction of pollutant generation by industrial manufacturing processes must be done by re-engineering with an economical orientation, so that its implementation will necessarily result also in economical benefits, supplemented with safer and improved working conditions.

In summary, the Apparatus and Process System With Downward Concurrent Flow of Scrap and Hot Gases for Stepped Preheating of Steel Scrap for Melting Metallurgical Furnace in accordance with the object of invention encompasses a multitude of major and minor functional and process system operating characteristics and parameters harmoniously aggregated into an embodiment, giving it:

Ability of the entire scrap preheating apparatus and process system to be added to majority electric arc furnaces in existing melt shops, with short return of investment time;

Ability to work in a synchronised tandem manner with most of the existing metallurgical melting furnaces, preferably with gas tight sealed electric arc furnace for steelmaking from cold ferrous scrap mixture;

Ability to significantly reduce the amount of hot gases exhausted from the electric arc furnace by completely eliminating oxy-fuel burners and so called process of "post combustion" from the furnace vessel;

Ability to improve energy efficiency by operating a scrap preheating apparatus in tandem with an electric arc furnace and by eliminating the energy inefficient oxy-fuel burners from the furnace shell vessel and relocating them to the scrap preheating apparatus;

Ability to improve energy efficiency by eliminating the so called "post combustion" in the electric arc furnace vessel and by exploiting the sensible and chemical thermal energy contained in the hot off-gases exhausted from the electric arc furnace in the compartments of the preheating apparatus with almost double efficiency of heat transfer from the gases to the scrap;

Ability to improve energy efficiency by eliminating the need to remove the roof of electric arc furnace when a charge of scrap is to be delivered into the furnace via an overhead crane with a conventional charging bucket.

Ability to eliminate need of overhead charging cranes and classic charging buckets by including a self-charging capability via integrated, semi-continuous self-charging, scrap bin elevating mechanism.

Ability to refill the scrap bin of the integrated, semi-continuous scrap bin elevating mechanism via conventional, low level, scrap moving horizontal conveyors or road transport scrap handling equipment preferably at a low ground level.

Ability to efficiently preheat cold ferrous scrap mixture semi-continuously charged into the top compartment of the apparatus to the predetermined temperature at its discharge from the bottom compartment, including the highest possible level of combustion of all combustible contaminant substances being introduced into the apparatus and which provides appropriate suction effects at different points of the apparatus and most importantly forcing combination of any and all gases entering the main vertical chamber to flow from the highest point of the top compartment downwards through the scrap in direction of flow concurrent with the flow of gravitationally descending scrap, combined hot gases encompassing the initial hot waste gases from the metallurgical-electric arc furnace, recuperative hot gases from terminal post combustion chamber, hot gases generated by oxy-fuel burners located in the walls of the compartments and as well hot gases resulting from oxidation of combustible substances contained in the charge via administered oxygen, oxygen enriched air or air.

Ability to preheat ferrous scrap mixture to the required nominal preheating temperature, without hot waste gases from the adjacent, operating in tandem electric arc furnace, by using only oxy-fuel burners of the preheating apparatus, and force delivering of the preheated scrap into the furnace vessel at initial increased rate, prior to "cold start-up" of the furnace, and by doing so, rapidly achieve normal, "flat bath" operating conditions due to prompt creation of the pool of molten metal under electrode(s), especially when augmented with oxy-fuel/oxygen lance and early formation of foamy slag;

Ability to reduce the oxidation loss of scrap by controlled gradual, stepped preheating of ferrous scrap mixture with intermediate temperature and gas composition conditioning via real time controlled oxy-fuel burners power input and introduction of oxidants;

Ability to control the semi-continuous gravitational descent of the ferrous scrap mixture via simple and robust adequately cooled, scrap descent controlling mechanism;

Ability to reliably discharge preheated ferrous scrap mixture from the converging bottom of the chamber into the heat resisting trolley-trough for forced delivery into the furnace, including weighing with required accuracy of each force delivered quantity of scrap;

Ability to, semi-continuously force deliver preheated ferrous scrap mixture from the preheating apparatus into the adjacent, tandem operating electric arc furnace, at the rate of the melting capability of the furnace, enabling furnace operation with an uninterrupted hot metal bath, with electric arcs permanently submerged in foamy slag of suitable depth, consistency and chemistry and as a consequence high thermal efficiency rapid melting—dissolving of scrap immersed into hot metal bath.

Ability to enable adjacent, tandem operation of a sealed metallurgical—electric arc furnace to continuously operate with hot metal bath due to semi-continuous forced delivering of preheated, prepared—reasonably sized ferrous scrap mixture into the furnace vessel at a rate of melting capability of the furnace;

When compared with traditional furnace operation, using cold scrap, the above listed abilities in accordance with the object of invention result in substantial improvements of the following technical parameters and economic factors:

Reduction of electric power input and furnace transformer capacity in the range of 30–35%;

Reduction of electric energy consumption in the range of 25–35%;

Reduction of electrode consumption in the range of 15–20%;

Reduction of exhausted waste gases in the range of 40–45%;

Reduction of dust and hazardous substances generation in the range of 20–25%;

Reduction of dioxins and furans below currently permitted limits;

Reduction of voltage flicker bellow permitted noticeable limits;

Possible elimination of electric HV compensating apparatus with optimised impedance of the furnace;

Shortening of tap-to-tap time in the range of 15–20%;

Possible down-sizing of the air filtering baghouse capacity in the range of 25–30%;

Reduced maintenance requirements due to drastic reduction in short circuit and fluctuating power input character of operation.

Improved safety and working environment conditions primarily due to semi-continuous and semi-automatic charging of the furnace with preheated scrap thus eliminating the explosion risk of hazardous open furnace dumping of wet scrap via a conventional charging bucket and as well effective lowering of the noise pollution level.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
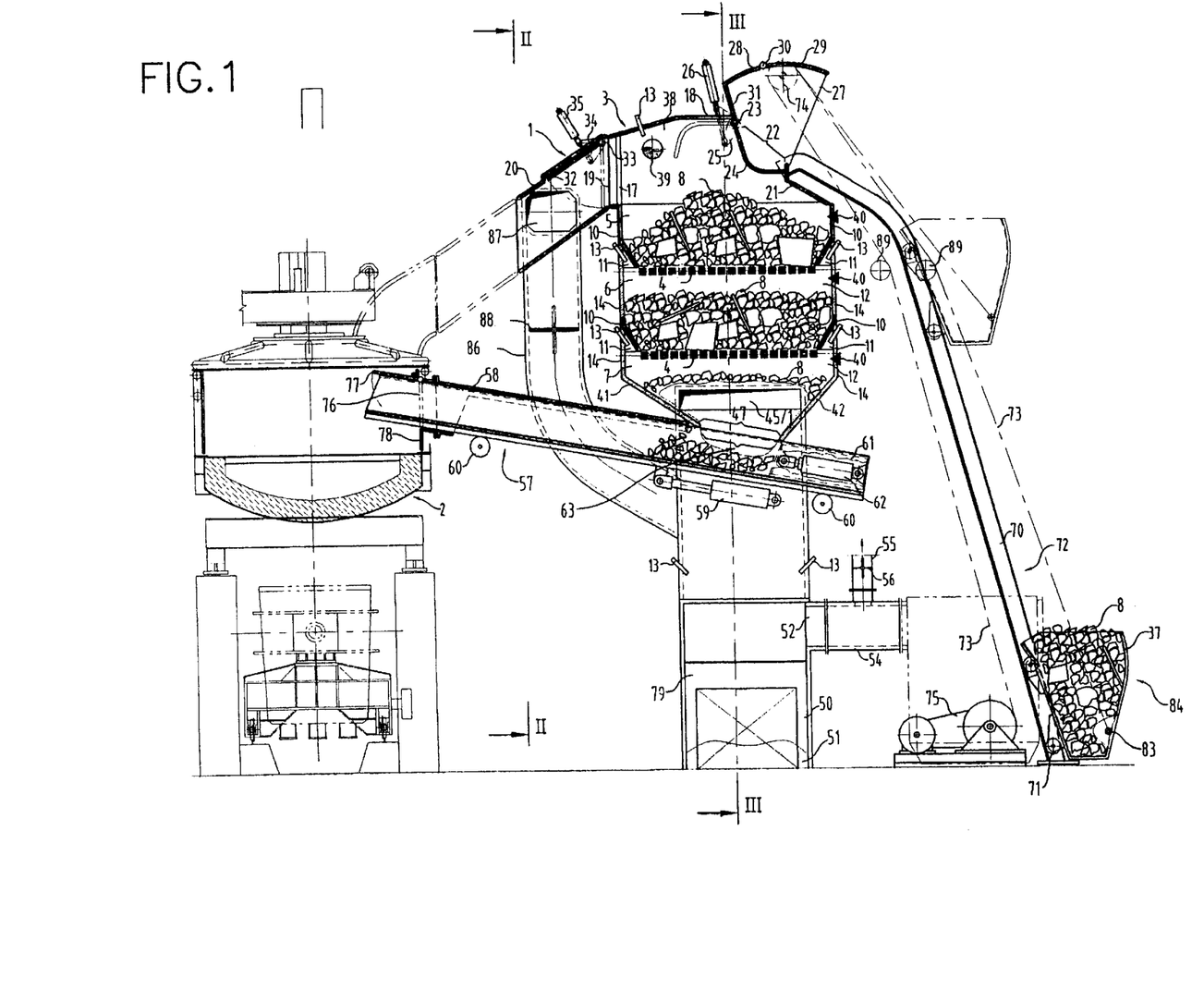
FIG. 1 shows a vertical longitudinal left hand section taken along line IV—IV in FIG. 2, of the scrap preheating apparatus, and the tandem operating adjacent electric arc furnace.

The scrap preheating apparatus and process system of the preferred embodiment shown in FIG. 1 and the other drawings includes the two, functionally interconnected, components: the scrap preheating apparatus 1, and an adjacent tandem operating electric arc furnace 2. The autonomous scrap preheating apparatus 1, shown in FIG. 1 consists of three major structural and functional assemblies: the main vertical preheating chamber 3, the inclined scrap bin 37 elevating self-charging equipment assembly 72 and inclined ferrous scrap mixture 8 charging mechanism 57, for transferring preheated ferrous scrap mixture 8 from the converging bottom compartment 7 of the main vertical preheating chamber 3 and force delivering ferrous scrap mixture 8 into the adjacent electric arc furnace 2.

The major component of the scrap preheating apparatus 1, is the main vertical preheating chamber 3, divided by the two sets of scrap descent controlling gridirons 4 into three compartments, namely the top compartment 5, middle compartment 6 and bottom compartment 7. Each of these three compartments 5, 6, and 7, has a specific task and purpose for ensuring the most efficient controlled gradual temperature increase of the cold ferrous scrap mixture 8. The mixture 8 is introduced into the scrap preheating apparatus 1 and descends semi-continuously by gravity, in sequence by the controlled swing and retract movement of the gridirons 4 as indicated in FIGS. 5a–5f.

The entire main vertical chamber 3 of the preheating apparatus 1, as well as the inner space 38 of the top compartment 5 FIG. 1, is intended to be sealed from the surrounding atmosphere and for that purpose its enclosing structure consists of gas tight, watercooled walls. The shorter lower wall portion 10 of the rectangular compartments have its bottom ends bent inwards, where they come together with gridirons 4 to create cradle like guides for better descent control of scrap 8 when the gridirons 4 are swung and lowered. At the same time the cavities 11 behind the inward bent bottom ends of the shorter wall portion 10, together with free space 12 between the scrap 8 in the middle compartment 6 and bottoms of gridirons 4 form sufficient space for mixing and combusting the gases permeating through the gridirons 4 from the top compartment 5 and gases from the oxy-fuel burners 13 installed in the refractory lined walls 14 enclosing in an gas tight manner, the space of the middle compartment 6. The bottom ends of the longer lower walls portion 15 shown in FIG. 3 of the top compartment 5 are also bent inwards for better scrap 8 guidance and for accommodation of the hydraulic cylinder actuated lever mechanisms 16, shown in FIG. 3, for controlling the movements of the comb like gridirons 4.

Adjacent to the furnace, shorter upper wall 17, FIG. 1, of the top compartment 5 extends vertically until it meets the generally horizontal closing panel 18. For entry of the hot waste gases from the electric arc furnace 2, via square water cooled duct 20, into the top compartment 5, the shorter upper wall 17 is equipped with square opening 19. To prevent hot waste gases from the electric arc furnace entering the top compartment 5 via square opening 19, the water cooled duct 20 is outfitted with water cooled square door 32, capable of rotating around water cooled shaft 33, controlled via lever mechanisms 34 and hydraulic cylinder 35. The shorter upper wall 21 of the top compartment 5 converges upward toward the centre and ends at the bottom of the square opening 22 that provides an entrance for the scrap bin 37 during semi-continuous charging of the scrap into the space of the top compartment 5. The upper end of the square charging opening 22 is defined by the water cooled shaft 23 to which is connected curved and square in projection water cooled sealing enclosure 24. The operation of the sealing enclosure 24 is controlled by the lever mechanisms 25 and hydraulic cylinders 26.

Figure 2:
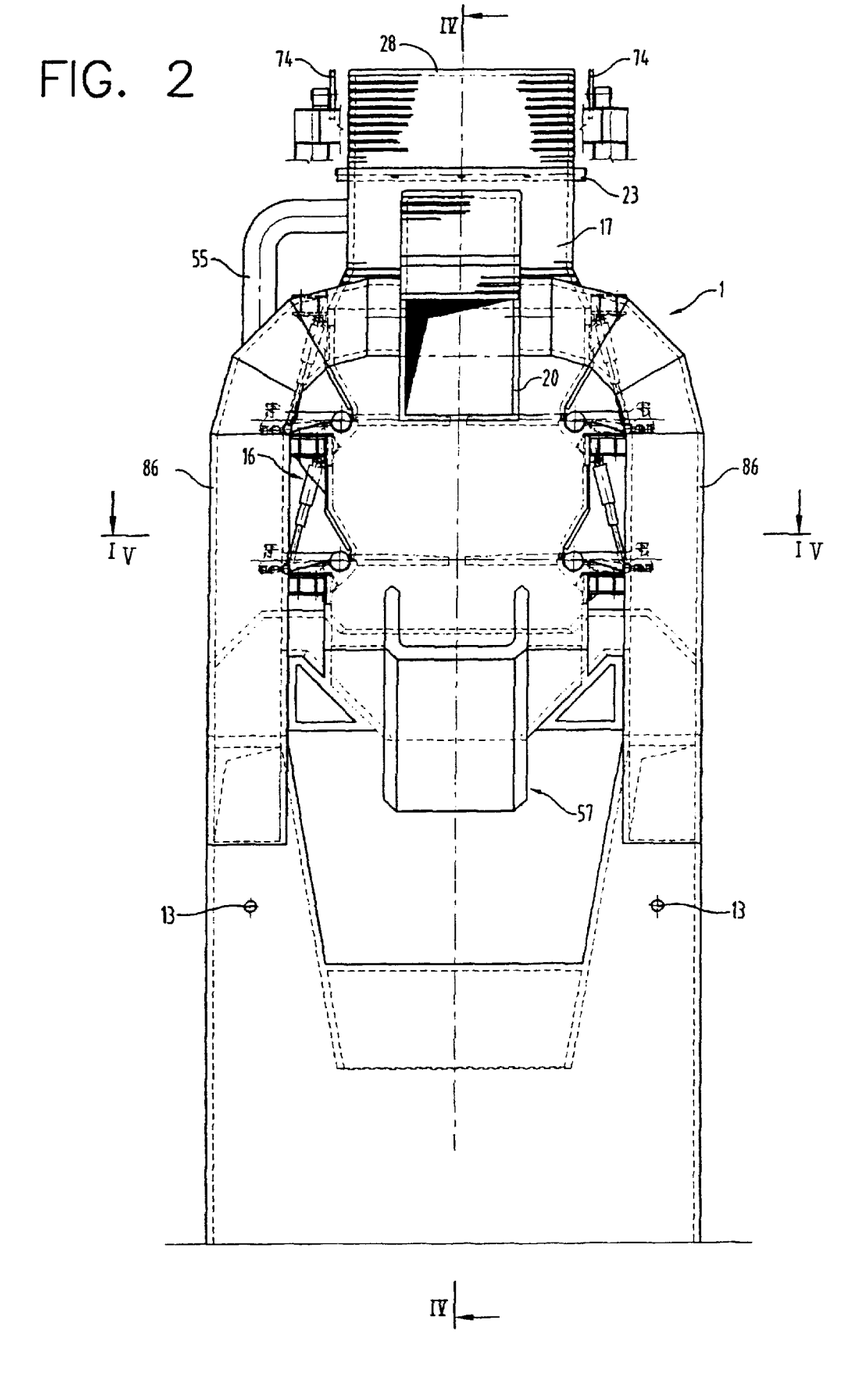
FIG. 2 shows a vertical lateral right hand elevation view taken along line II—II of the FIG. 1, of the scrap preheating apparatus.

The longer upper walls 27, FIG. 2, of the top compartment 5 are from the connecting line with the longer lower walls 15 first converging inward, toward the centre and then extend vertically, defining the vertical sides of the square charging opening 22. The shape of the longer upper walls 27 in their upper portion has an arcuate, fan blade form. The arcuate shape of the vertical longer upper walls 27 is partially connected with the curved, generally horizontal panel 28. The remaining portion of the arcuate shape between vertical longer upper walls 27 is covered by a curved, generally horizontal panel 29, capable of rotating around horizontally oriented water cooled shaft 30, FIG. 1. The length of the curved panel 29 is governed by the position of the partially rotated scrap bin 37, such that the top square profile ledge of the partially rotated scrap bin 37 must be under the end of the curved panel 29 before the ferrous scrap mixture 8 begins discharging from the partially rotated scrap bin 37. In this way the length of the curved panel 29 also dictates the position of the inclined ending ledge of the longer upper walls 27.

Figure 3:
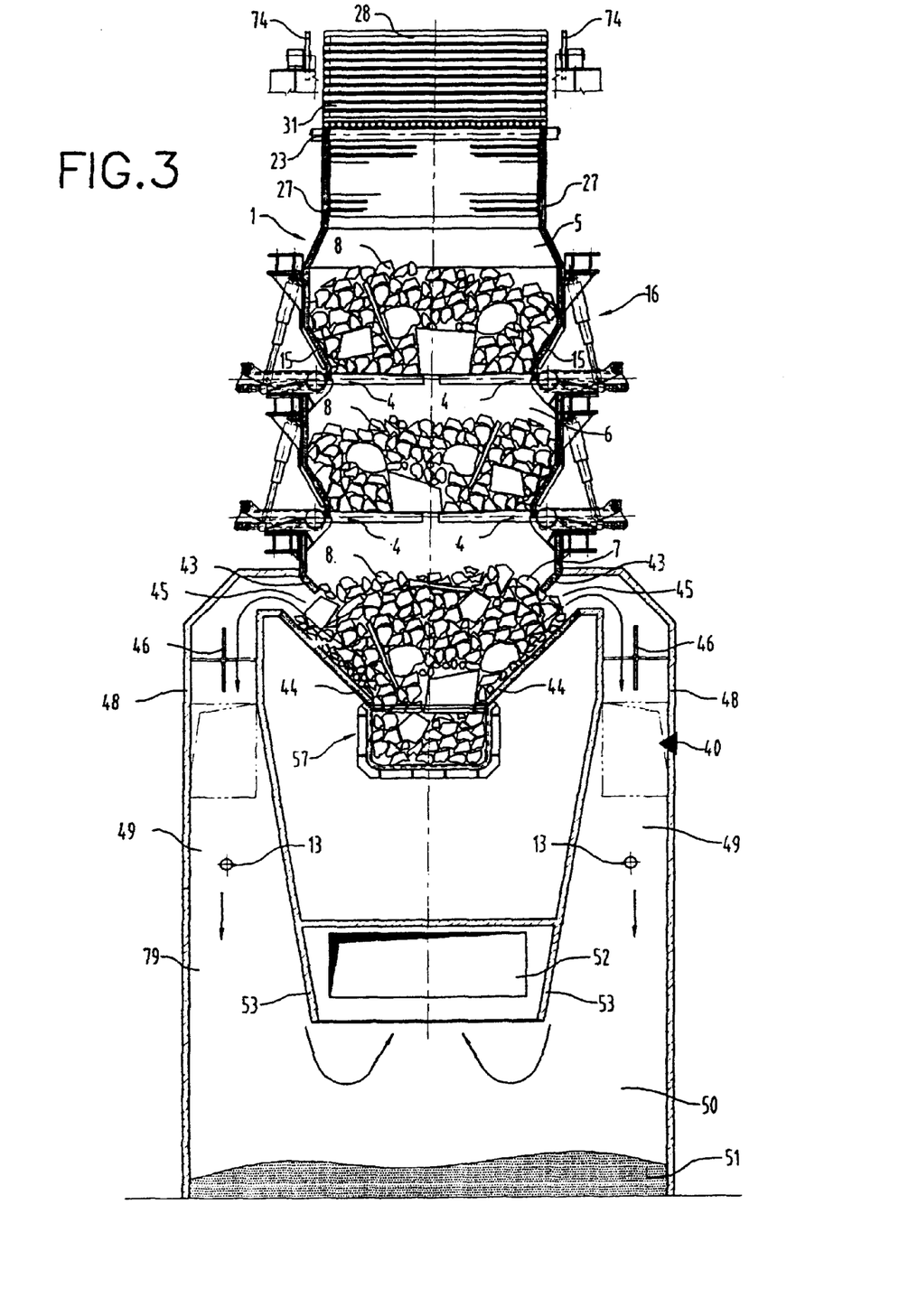
FIG. 3 shows vertical lateral section taken along line III—III in FIG. 1.
Figure 6:
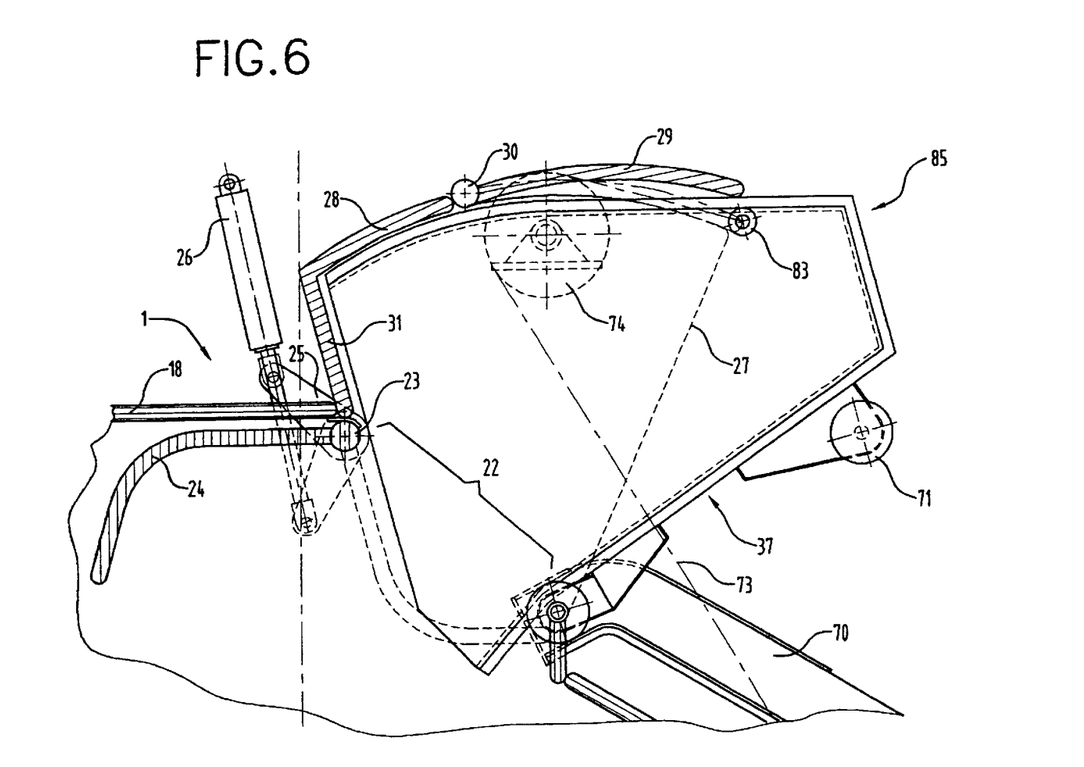
FIG. 6 shows enlarged vertical sectional detail of the scrap bin as shown in FIG. 1, in its top discharging position, with main preheating chamber top compartment sealing closure open.

Generally vertical wall panel 31, FIG. 1; FIG. 3 and FIG. 6, closes the void between the vertical longer upper walls 27, closer to the centre end of the permanent and curved panel 29 and horizontally oriented water cooled shaft 23. The above described arrangement of the sealed, gas tight structural enclosure of the top compartment 5 at the same time creates a cavity for temporary sealing between sides of the charging scrap bin 37 and vertical longer upper walls 27 and as well between rotating scrap bin 37 and curved panel 29 during charging of the cold ferrous scrap mixture 8 into the preheating apparatus 1 via charging bin 37.

One of the specific purposes of the top compartment 5 of the main vertical preheating chamber 3 is to initially receive and compile on the comb like gridirons 4 an appropriate quantity of ferrous scrap mixture 8 required for achieving of its initial desired temperature during allotted resident time. The cold ferrous scrap mixture 8 is delivered semi-continuously, in one or more rapid repetitive travels of the charging scrap bin 37 into the top compartment 5 via opening 22, normally closed by the sealing enclosure 24. Intake of a large quantity of undesirable false air during charging of the cold ferrous scrap mixture 8/1 from the charging scrap bin 37 into top compartment 5 via opening 22 is prevented because opening and closing of the sealing closure 24 is synchronised with the sealed position of the charging scrap bin 37 during its emptying. Another specific task and purpose of the top compartment 5 is to enable and assure proper and safe mixing of hot waste gases from electric arc furnace 2, delivered via opening 19 into the free space 38 above ferrous scrap 8. Recuperative hot gases from final post combustion chamber 79, are also delivered via duct 54 and 55 into the free space 38 of the top compartment 5 via opening 39 for suitable combustion of the created mixture of all gases involved. This is achieved via standardised variable fuel oxygen ratio oxy-fuel burners 13 controlled by real time electronic regulating system based on information from gases analysis, pressure and temperature sensors 40. After achieving the required temperature of the resulting final gas mixture through their adequate ratio pre-set partial combustion, the temperature conditioned gases are forced to a con-current downward flow through the compiled quantity of ferrous scrap mixture 8/1 residing on permeable gridirons 4. Due to the optimal ratio of the area and depth of the quantity of the ferrous scrap mixture 8, the hot gases are permeating through the ferrous scrap mixture 8 with most favourable velocity and with prominent heat transfer efficiency.

Finally it is another specific purpose and task of the top compartment 5 to deliver by gravity, and in one simple operation, with a certain degree of mixing but without impact the entire compiled quantity of ferrous scrap mixture 8, partially preheated during allotted resident time, into the previously emptied middle compartment 6, by the release operation of the gridirons 4.

Specific purposes and tasks of the middle compartment 6 of the main vertical preheating chamber 3 are similar to the purposes and tasks of the top compartment 5. The prime task and purpose of the middle compartment 6 is to accept and safely hold on its gridirons 4 the entire quantity of already partially heated ferrous scrap mixture 8 transferred by gravity from top compartment 5, when gridirons 4/are moved from their horizontal position under the ferrous scrap mixture 8. The next purpose of the middle compartment 6 is to enable and assure additional adequate partial combustion of gas mixture emerging through the gridirons 4 into the free spaces 11 and 12 above ferrous scrap mixture 8 with its temperature previously increased by operation of the burners 13 and waste furnace gases. As a rule, the gas mixture permeating through the gridirons 4 contains significant quantities of gaseous combustible components originating mainly from combustible contaminating impurities included in ferrous scrap mixture 8 and which were exposed to high temperatures without presence of sufficient oxidant during the previous heating stage in top compartment 5. Also during the previous heating stage in the top compartment 5, the initially higher temperature gases when flowing downwards through the ferrous scrap mixture 8, have transferred a certain amount of their thermal energy to the ferrous scrap mixture 8 and therefore they must be also temperature conditioned. To achieve the required additional and adequate partial combustion of gas mixture emerging through the gridirons 4 into the free spaces 11 and 12 above ferrous scrap mixture 8 in middle compartment 6 with simultaneous increase of the temperature of the gases with standardised variable fuel oxygen ratio, oxy-fuel burners 13 are used in the same way as in top compartment 5. The standardised burners 13 are controlled in the same way as in the top compartment 5. The downward concurrent flow of re-heated gases through the ferrous scrap mixture 8 in the middle compartment 6 as well as heat transfer efficiency is the same as in top compartment 5. Ferrous scrap mixture 8 preheated in the middle compartment 6 to a further increased temperature during the allotted resident time is delivered by gravity into previously emptied bottom compartment 7 by the release operation of the gridirons 4.

The bottom compartment 7 of the main vertical preheating chamber 3 has a similar function to that of the top compartment 5 and middle compartment 6. The main task of the bottom compartment 7 is to accept and safely hold in its inverted pyramidal cavity or converging bottom the entire quantity of the highly preheated ferrous scrap mixture 8 transferred by gravity from the middle compartment 6. The converging, pyramidal form of the bottom compartment 7 is made up from refractory lined walls 14 and water cooled shaped segments 41; 42; 43 and 44, all of which are at their bottom establishing rectangular opening 47. Opening 47 serves for discharging of the ferrous scrap mixture 8 preheated to an average temperature of 700° C into inclined, transferring charging mechanism 57. Transferring charging mechanism 57 serves for transferring and forced charging of the ferrous scrap mixture 8, preheated to the required high temperature, from the preheating apparatus 1 into adjacent electric arc furnace 2 through an opening 76 in the shell side wall 78, which is closed the during furnace tilting operation with the water cooled door 77. The transferring-charging mechanism 57 consists of a partially water cooled trough or conduit of rectangular cross-section 58, having a width matching the width of the discharge opening 47. Rectangular conduit 58 is equipped with an internal, matching rectangular reciprocating plunger-ram 61. Reciprocating movements of the plunger-ram 61 inside of the rectangular conduit 58 are controlled by a watercooled double acting hydraulic cylinder 62. The rectangular conduit 58 is located on rollers 60 enabling it to be mobile along its longitudinal axis. Extending and retracting movement of the rectangular conduit 58 along its longitudinal axis is controlled by the double acting hydraulic cylinder 59. For receiving preheated ferrous scrap mixture from the discharge opening 47, the top wall of the rectangular conduit 58 has an opening 63, its dimensions and location corresponding to the dimensions of the discharge opening 47. In the stand-by, not charging mode the double acting cylinder 59 is retracted, the rectangular conduit 58 is withdrawn from the electric arc furnace 2, however, the plunger 61 remains in extended mode inside of the conduit 58 and therefore covers and seals the entire discharge opening 47 preventing preheated ferrous scrap mixture to fall into the charging mechanism 57.

To commence forced transfer and charging of the high temperature ferrous scrap mixture 8 into the electric arc furnace 2, the plunger 61 inside of the rectangular conduit 58 is retracted allowing ferrous scrap mixture 8 to fall into the cavity of the rectangular conduit 58, which is then moved forward on rollers 60 and inserted into the electric arc furnace 2 by actuating extending double acting hydraulic cylinder 59. The forward move of the rectangular conduit 58 closes with its top wall the discharge opening 47. Since double acting hydraulic cylinder 62 and reciprocating plunger-ram 61 are in a retracted position, high temperature preheated ferrous scrap mixture 8/3 travels inside of the conduit 58. Forward movement of the reciprocating plunger-ram 61 caused by actuating extending of the double acting hydraulic cylinder 62, results in forward pushing of the high temperature preheated ferrous scrap mixture 8 through the interior of the rectangular conduit 58. After forward movement of the plunger-ram 61, the high temperature preheated ferrous scrap mixture 8 starts falling into the electric arc furnace 2 molten bath, in the vicinity of electric arc, where it rapidly melts by direct convection. Although the high temperature preheated ferrous scrap mixture 8 is pushed gradually through the interior of the inclined rectangular conduit 58, due to relatively low friction factor, only moderate force is required for the pushing operation.

The next purpose and task of the bottom compartment 7 is to enable and assure additional highest possible combustion of gas mixture flowing downwards through the gridirons 4 into the free spaces 11 and 12 above ferrous scrap mixture 8. Again, as in the previous stage, the initially higher temperature gases when flowing downwards through the ferrous scrap mixture 8, have transferred a certain amount of their thermal energy to the ferrous scrap mixture 8 and must again temperature conditioned to the optimum required temperature. To achieve final required additional and adequate maximum combustion of gas mixture flowing downwards through the gridirons 4 in the free spaces 11 and 12 above ferrous scrap mixture 8 in the bottom compartment 7, with simultaneous final increase of the temperature of the gases standardised, variable fuel oxygen ratio, oxy-fuel burners 13, are employed in the same way as in top compartment 5 and middle compartment 6. The standardised burners 13 are controlled in the same way as in the previous top compartment 5 and middle compartment 6. The downward concurrent flow of again re-heated gases, after permeating through the ferrous scrap mixture 8, is exhausted from the bottom compartment 7 through the two rectangular openings 45, FIG. 3, into diverging, refractory lined rectangular ducts 48, outfitted with butterfly closing valves 46 for preventing flow of the gases from the preheating apparatus 1, when required during operation without the preheating apparatus 1, and allowing a bypass flow of gases from electric arc furnace 2, directly into dust catching, diverging, rectangular, refractory lined ducts 48. Interior spaces 49 of ducts 48 serve also as final post-combustion chambers 79. For that reason they are equipped with standardised oxy-fuel burners 13, controlled in the same way as in the compartments 5, 6 and 7. Duct interiors 49 are joined at the top of the drop-out box 50, where the exhausted gases after loosing their velocity, allow sedimentation of heavier dust particles 51 at the bottom of the drop-out box 50. Totally combusted gases having temperature higher than the critical value required for burning—cracking of undesirable volatile hydrocarbons including dioxins and furans are exhausted via inverted gas channel 53 at the centre top of the drop-out box 50 through the opening 52 and duct 54 for further use and treatment. For additional improvement of energy recuperation a portion of the hot waste gases is returned from the duct 54 via duct 55, equipped with butterfly closing valve 56, into top compartment 5 through the opening 39.

Figure 4:
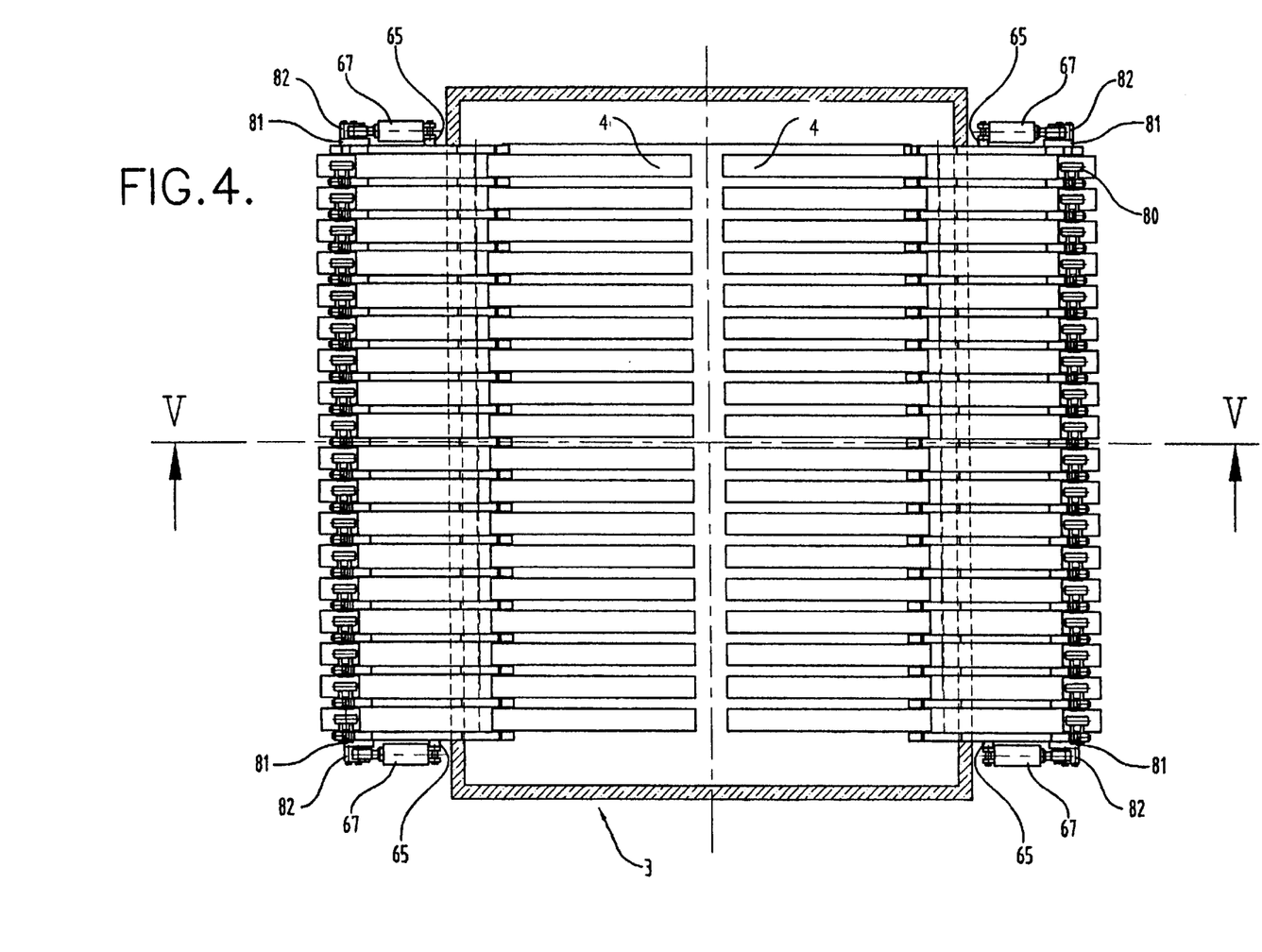
FIG. 4 shows a horizontal section view of the two gridiron halves of the scrap gravitational descending controlling mechanism at the level taken along line IV—IV of FIG. 2.
Figure 5A:
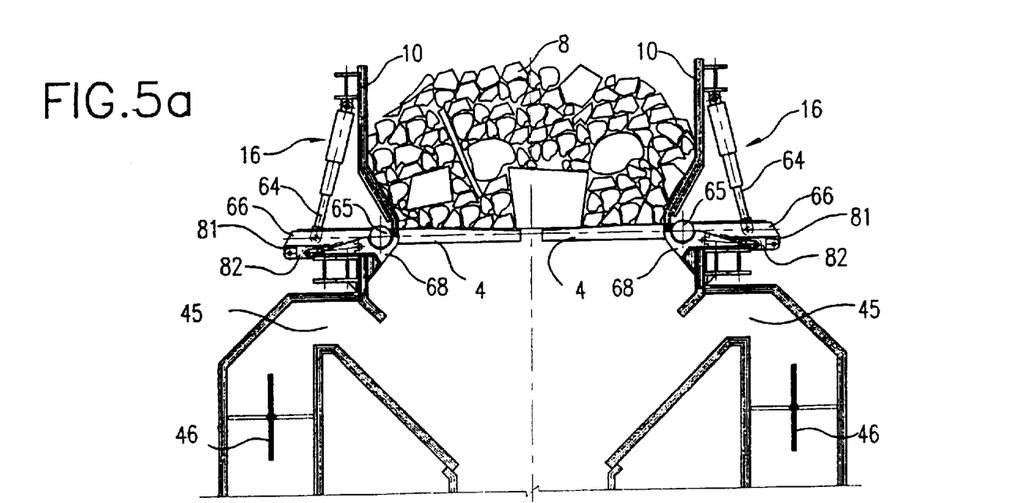
FIGS. 5a, 5b, 5c, 5d, 5e and 5f show progressive vertical sections taken along line V—V in FIG. 4, showing the progress of scrap descent and the descent controlling mechanism with its rotating and retracting and extending functional movements.
Figure 5B:
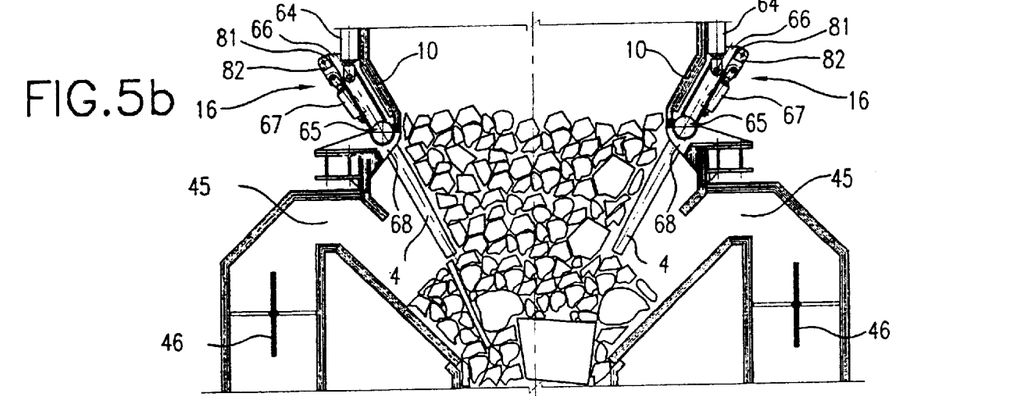
Figure 5C:
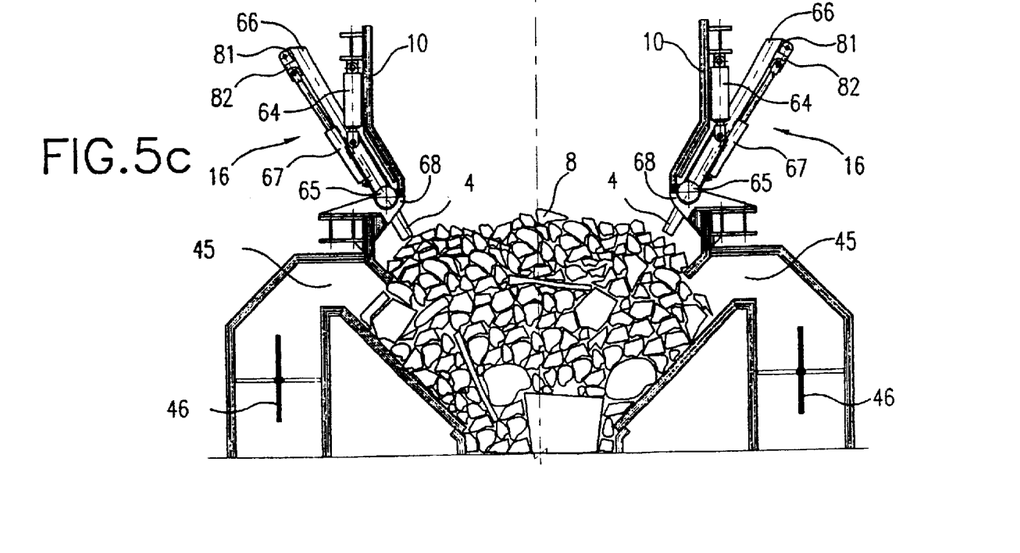
Figure 5D:
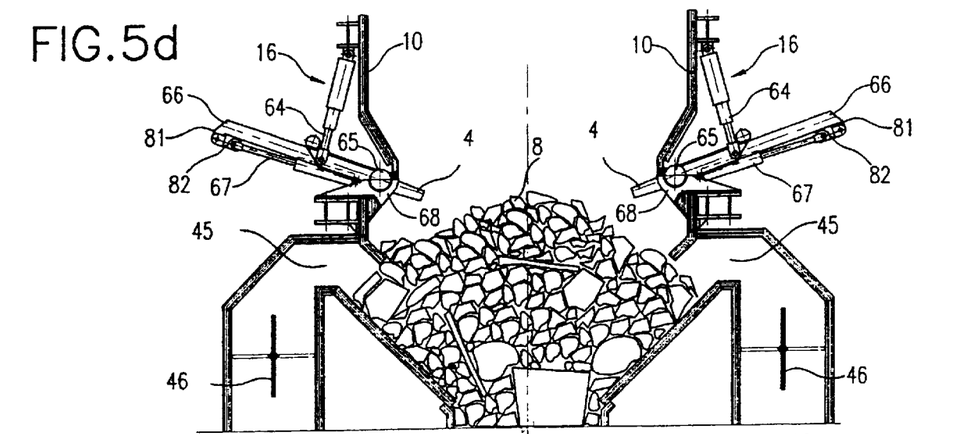
Figure 5E:
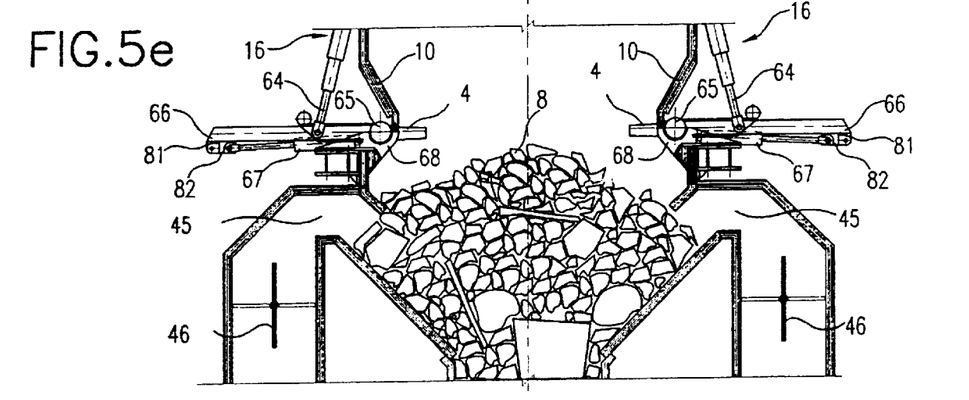
Figure 5F:
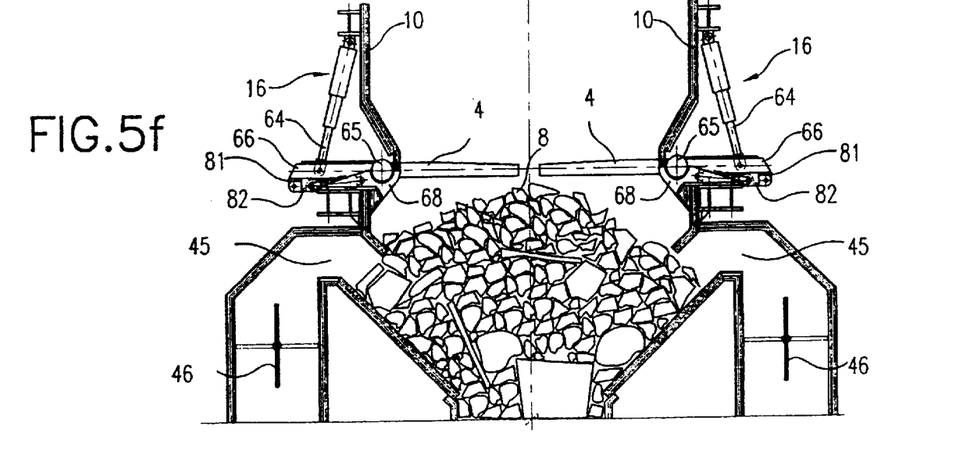

One of the important features of the presented embodiment is the control of semi-continuous gravitational descent of the ferrous scrap mixture 8 by mechanism assemblies 16, (abbreviated "descent controlling mechanism 16") shown in different views and cross-sections, whole or in part in FIG. 1, FIG. 2, FIG. 3, FIG. 4. For better understanding of characteristic and advantageous functional movements of the parts and components of the descent controlling mechanism 16, detail vertical cross-sections along line V—V of the FIG. 4, are shown in FIG. 5a; FIG. 5b; FIG. 5c, FIG. 5d; FIG. 5e and FIG. 5f. Basic functional components of the descent controlling mechanisms 16 are: Stationary, water cooled, multipoint frame supports 68, Main rotating frame 66, rotation controlling, double acting hydraulic cylinders 64, extension and retraction of gridirons 4 controlling, double acting hydraulic cylinders 67, and connecting beam 81. Main rotating frame 66 is a one piece mechanical structure featuring spaced rectangular guiding openings for each of grid irons 4 and allowing their movement along their longitudinal axis. Rotation of the main rotating frame 66 is made possible by disc shaped extensions 65, attached to the frame 66 and located in the spaces between rectangular guiding openings of the frame 66. To the other, outside end of the rotating frame are on its top attached rollers 80 for reduction of friction between rotating frame structure 66 and individual gridirons 4 during their movement along their longitudinal axis. Each of the gridirons 4 is on its outside end connected via rod eye-clevis type connection 82 to the horizontally oriented, beam 81. Beam 81 is connected via double acting hydraulic cylinder 67 to the main rotating frame 66. Rotation of the main rotating frame 66 around centre line of its disc shaped extensions 65 inserted freely into matching semi-circular openings of the stationary multipoint supports 68 is controlled by retracting or extending of single acting telescopic hydraulic cylinders 64.

As shown in FIG. 5a, in its basic operating position, the comb like formation of gridirons assemblies 4 are extended horizontally, inwards into the main vertical preheating chamber 3 for holding and preventing gravitational descent of the ferrous scrap mixture 8. This is achieved by pressurising of the extended telescopic hydraulic cylinders 64. When controlled gravitational descent of the ferrous scrap mixture 8 is desired, retraction of the normally extended single acting, telescopic hydraulic cylinders 64 is initiated by controlled releasing of the hydraulic fluid from the cylinder 64. Shown in FIG. 5b, due to the mass of the ferrous scrap mixture 8, the main rotating frame 66, including extended gridirons 4 rotate around centre line of the disc shaped frame extensions 65 causing inside ends of the extended comb like gridirons 4 to rotate downwards. By this controlled initial operation a portion of the ferrous scrap mixture 8 is allowed to descent by gravity into the bottom compartment 7. To complete gravitational descent of the entire load of the ferrous scrap mixture 8 into the bottom compartment 7, double acting hydraulic cylinders 67 are actuated. Since cylinders 67 are installed between the structure of the main rotating frame 66 and horizontally oriented beam 81, both gridirons assemblies 4 are withdrawn in generally vertical direction from the compartment 7 allowing the rest of the ferrous scrap mixture 8 to descent by gravity into the bottom compartment 7., as shown in FIG. 5c. In order to return the comb like gridiron formation 4 into its initial inwards inserted position, the hydraulic cylinder 64 are extended forcing the main rotating frame 66 including retracted gridirons 4 to return mainly by gravity into their horizontal position, as shown in FIG. 5d and FIG. 5e. After this first step is completed, the double acting hydraulic cylinders 67 are actuated to retract. Retraction of the hydraulic cylinders 67 results in no-load insertion of the comb like gridiron formation 4 to resume their initial horizontal position, above ferrous scrap mixture 8 in the bottom compartment shown in FIG. 5f. By resuming their initial inserted horizontal position, the gridirons assemblies 4 are immediately ready to accept transfer of another partially preheated load of ferrous scrap mixture 8 from the top compartment 5. The described unique sequential rotating and retracting—extending movements of the main rotating frame 66 and comb like gridiron formation 4 are extremely important feature of the embodiment. The described arrangement eliminates delays and waiting times and reduces the overall structural height of the preheating apparatus 1. This in turn allows installation of the ferrous scrap mixture preheating apparatus 1 in existing meltshops, which is of utmost importance for reducing significantly the cost of installation.

In accordance with the invention, a preferred embodiment includes an integral, inclined elevator mechanism 72, serving for elevating of cold ferrous scrap mixture 8 via cold scrap bin 37, for semi-continuous self-charging of the preheating apparatus and process system 1, is shown in FIG. 1 and in more detail in FIG. 6. The main component of the scrap elevator mechanism 72 is the cold scrap bin 37, of simple heavy duty design, having specific shape and adequate volume, and equipped with wheels 71. Wheels 71 are engaged with and guided by the robust and properly configured U-profiled guides 70, forcing cold scrap bin 37 to travel from its bottom loading position shown in FIG. 1 into the top unloading position shown in FIG. 6 as per an exactly predetermined path, dictated by the configuration of the guides 70. Lifting and lowering travel of the cold scrap bin 37 is controlled by the hoisting device 75, cables 73, cables redirecting pulleys 89 and cables direction reversing pulleys 74. Cables 73 are connected to sides of the cold scrap bin 37 via swivelling connections 83.

The inclined elevator mechanism 72, has advantageous, reliable and practically maintenance free simple functioning, perfectly suitable for the extreme meltshop operating conditions. When actuated in lifting mode, the hoisting device 75 lifts the cold scrap bin 37, previously loaded with adequate quantity of cold ferrous scrap mixture 8, via cables 73 and pulleys 89 and 74, from its bottom cold scrap loading position (FIG. 1) into the top cold scrap unloading position (FIG. 6). For sealed charging of the preheating apparatus 1, as soon as the square top profile-ledge of the cold scrap bin 37 reaches the ledge 27 and enters the square cavity at the top of the preheating apparatus 1, double acting hydraulic cylinder 26 rotates the sealing enclosure 24, completely disengaging the opening 22. In this manner, the square profile of the cavity in the top of the preheating apparatus 1 and the square profile of the top of the scrap bin 37 create an adequate dynamic seal preventing communication between the space 38 of the top compartment 5 and the surrounding atmosphere. Rotational removal of the sealing enclosure 24 allows free and unrestricted unloading of the cold ferrous scrap mixture 8 into the top compartment 5. After emptying of the cold ferrous scrap mixture 8 from the cold scrap bin 37, the hoisting device 75 is reversed into lowering mode and the cold scrap bin 37 returns to its bottom loading position 84. The sealing enclosure 24 is closed by the cylinder 26 before the dynamic sealing between cold scrap bin 37 and the top square cavity of the preheating apparatus 1 is interrupted by return travel movement of the cold scrap bin 37.

If necessary for maintenance or operational requirements, the hot gases from the electric arc furnace 2, could be bypassed from the main duct 20, through the bypass opening 87 and into two bypass ducts 86 by opening bypass butterfly valves 88. The hot gases are directly into final combustion chambers 79, by also closing square water cooled door 32 when actuated by the hydraulic cylinder 26, and by closing normally open butterfly valves 46.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A preheating apparatus, for preheating a ferrous scrap mixture prior to feeding the scrap into a metallurgical furnace, primarily using heat recovered from hot waste gases emitted from the furnace exhaust port, and for simultaneously reducing contaminants from the scrap and from the waste gases, with concurrent downward flow of hot waste gases and downwardly descending scrap, the apparatus comprising:

a chamber, including:
a top compartment with cold scrap input means for depositing cold scrap into the top compartment and a hot waste gas inlet in flow communication with the furnace exhaust port; and
a bottom compartment with heated scrap discharging means for feeding the heated scrap into the furnace and a waste gas outlet in flow communication with vacuum means for evacuating spent waste gas;
gas permeable gate means disposed between each said chamber compartment and sequentially operable between a closed gate position and an open gate position, for concurrently receiving a gravity fed charge of scrap from the cold scrap input means in a closed gate position, and during a dwell period supporting said charge while hot waste gas flows from the hot gas inlet in the top compartment, permeates downwardly through the scrap charge and through the closed gate means, and flows out the waste gas outlet in the bottom compartment; and for controlling the gravitational descent of said charge when in the open position from the top compartment to the bottom compartment on expiration of the dwell period.

2. A preheating apparatus according to claim 1 wherein the gas permeable gate means comprise:

two opposing mirror image gridiron assemblies extending into the chamber;

gridiron tilting means for rotating the gridiron assemblies from a horizontal scrap supporting closed position to a downwardly sloping open position; and gridiron axial extension and retraction means for retracting the gridiron assemblies within the chamber in a withdrawn position and for extending the gridiron assemblies horizontally to an extended position.

3. A preheating apparatus according to claim 2 wherein the gridiron assemblies comprise a plurality of spaced apart gridirons extending within the chamber.

4. A preheating apparatus according to claim 1 wherein the heated scrap discharging means comprise;

a converging bottom comprising inclined bottom walls of the bottom compartment with a bottom opening;

a charging conduit extending between the bottom opening and the furnace, with a heated scrap accumulating space within the charging conduit for receiving scrap descending through the opening; and heated scrap force delivering means for forcing scrap into the furnace through the charging conduit.

5. A preheating apparatus according to claim 4 wherein the heated scrap force delivering means comprise a reciprocating ram with a scrap pushing bulkhead, the ram operable between a standby position wherein a charge of heated scrap falls through the bottom opening to accumulate in advance of the bulkhead, and a charging mode wherein the ram pushes the heated scrap into the furnace.

6. A preheating apparatus according to claim 1 wherein the chamber includes at least one intermediate compartment disposed between the top and bottom compartments with said gas permeable gate means disposed between each said compartment.

7. A preheating apparatus according to claim 1 wherein each compartment includes sensor means for monitoring the characteristics of the waste gas and scrap resident therein selected from the group consisting of: gas chemical composition; gas temperature; gas pressure; and scrap temperature, for controlling the burners.

8. A preheating apparatus according to claim 1 wherein each compartment includes compartment burner means for controlling the combustion rate and temperature of the waste gas and scrap resident therein.

9. A preheating apparatus according to claim 1 wherein the hot waste gas inlet includes a bypass duct in flow communication with the waste gas outlet and bypass valve means for diverting hot waste gas directly to the waste gas outlet.

10. A preheating apparatus according to claim 1 wherein the cold scrap input means comprise a charging bin shuttling between a loading position a distance from the chamber and an unloading position extending within a sealable opening in the top compartment.

11. A preheating apparatus according to claim 10 wherein the sealed opening comprises at least one sealed door and wherein internal edges of the sealed opening mate with adjacent outer walls of the charging bin in the unloading position.

12. A preheating apparatus according to claim 10 wherein the charging bin rolls on an inclined elevating ramp propelled by a hoisting device.

13. A preheating apparatus according to claim 1 wherein the waste gas outlet includes a post combustion compartment with precipitation means for reducing solid particulate contaminates from the waste gas.

14. A preheating apparatus according to claim 13 wherein the post combustion chamber includes post burner means for burning combustible contaminants in the waste gas resident therein.

15. A preheating apparatus according to claim 13 including a gas recycling conduit communicating between the post combustion compartment and the top compartment.

16. A preheating apparatus according to claim 13 wherein the precipitation means comprise a vertically bent duct.

17. A preheating apparatus according to claim 13 wherein the precipitation means comprise a flared diffuser duct.

18. A preheating apparatus according to claim 13 wherein the precipitation means include a solid particulate drop out box.

19. A method of preheating a ferrous scrap mixture prior to feeding the scrap into a metallurgical furnace, using heat recovered from hot waste gases emitted from the furnace exhaust port, and simultaneously reducing contaminants from the scrap and from the waste gases, with concurrent downward flow of hot waste gases and downwardly descending scrap, the method comprising:

depositing a charge of cold scrap on a gas permeable closed gate within a top compartment of a chamber, the top compartment including a hot waste gas inlet in flow communication with the furnace exhaust port;

supporting the scrap on the closed gate for a dwell period while hot waste gas flows from the hot gas inlet in the top compartment, permeates through the scrap charge and through the closed gate, and flows out a waste gas outlet in a bottom compartment of the chamber;

controlling the gravitational descent of by opening the gate and permitting scrap flow from the top compartment to the bottom compartment on expiration of the dwell period;

force delivering the heated scrap from the bottom compartment into the furnace; and repeating the above steps in a sequentially stepped manner for successive discreet charges of scrap.

20. A method according to claim 19 wherein the step of supporting the scrap for said dwell period includes further heating the waste gas and scrap with compartment burners within each compartment.

* * * * *